(12) United States Patent
Zheng et al.

(10) Patent No.: US 9,864,379 B2
(45) Date of Patent: Jan. 9, 2018

(54) NAVIGATION ERRORS CORRECTION METHOD BASED ON MAGNETIC NAIL POSITIONING

(71) Applicant: Guangdong Jaten Robot & Automation Co., Ltd., Foshan, Guangdong (CN)

(72) Inventors: Zhizeng Zheng, Guangdong (CN); Weiqi Huo, Guangdong (CN)

(73) Assignee: GUANGDONG JATEN ROBOT & AUTOMATION CO., LTD., Foshan, Guangdong (CN)

( * ) Notice: Subject to any disclaimer, the term of this patent is extended or adjusted under 35 U.S.C. 154(b) by 0 days.

(21) Appl. No.: 15/013,971

(22) Filed: Feb. 2, 2016

(65) Prior Publication Data

US 2017/0003688 A1 Jan. 5, 2017

(30) Foreign Application Priority Data

Jun. 30, 2015 (CN) .......................... 2015 1 0386093

(51) Int. Cl.
| | | |
|---|---|---|
| G05D 1/02 | (2006.01) | |
| G01C 21/16 | (2006.01) | |
| G05D 1/00 | (2006.01) | |

(52) U.S. Cl.
CPC ......... G05D 1/0259 (2013.01); G01C 21/165 (2013.01); G05D 1/00 (2013.01); G05D 1/0274 (2013.01)

(58) Field of Classification Search
CPC .. G05D 1/0259; G05D 1/0274; G05D 1/0261; G05D 1/0263
See application file for complete search history.

(56) References Cited

U.S. PATENT DOCUMENTS

| | | | | |
|---|---|---|---|---|
| 5,258,911 A | * | 11/1993 | Wellman | G05D 1/0229 180/167 |
| 5,913,376 A | * | 6/1999 | Takei | B60K 31/0058 180/168 |
| 2002/0165648 A1 | | 11/2002 | Zeitler | |
| 2012/0179337 A1 | | 7/2012 | Doan | |
| 2012/0316722 A1 | | 12/2012 | Zeitler et al. | |

(Continued)

OTHER PUBLICATIONS

You et al., "Localization Using Magnetic Patterns for Autonomous Mobile Robot", International Journal of Advanced Robotic Systems, vol. 11 Issue 3, Mar. 2014, pp. 1-10.*

*Primary Examiner* — Todd Melton
(74) *Attorney, Agent, or Firm* — Hauptman Ham, LLP

(57) ABSTRACT

A navigation errors correction method based on magnetic nail positioning includes a magnetic nail is set within the moving area of AGV, and an information-bearing magnetic field mode is established according to magnetic field formed and stored in a navigation device. The method further includes a navigation device in AGV guides movement of AGV; a magnetic sensor on AGV detects features of magnetic field on movement track. Contrast features of magnetic field detected by magnetic sensor with those of magnetic field mode prestored by navigation device, and reckon the relative position of magnetic nail and AGV. Based on relative position of magnetic nail and AGV, reckon current position of AGV, the navigation device adjusts position and orientation of AGV and guides AGV to repair movement errors based on reckoning position of AGV.

6 Claims, 1 Drawing Sheet

(56) References Cited

U.S. PATENT DOCUMENTS

| | | | |
|---|---|---|---|
| 2014/0015339 A1* | 1/2014 | Hua | G05D 1/0261 307/104 |
| 2015/0139762 A1* | 5/2015 | Stephens | E04H 6/424 414/261 |
| 2015/0247719 A1* | 9/2015 | Huang | B62D 15/025 701/41 |

* cited by examiner

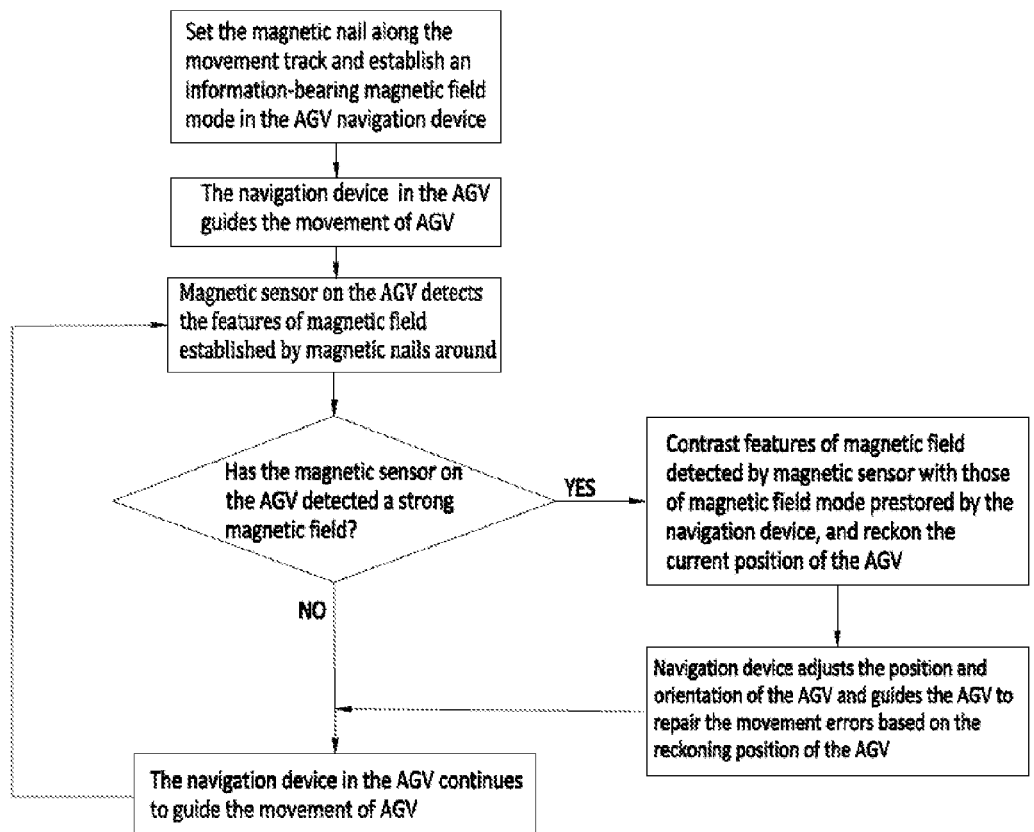

NAVIGATION ERRORS CORRECTION METHOD BASED ON MAGNETIC NAIL POSITIONING

FIELD OF THE INVENTION

The present invention relates to Automatic guided vehicle (AGV) navigation method, and more particularly to a navigation errors correction method based on magnetic nail positioning.

BACKGROUND OF THE INVENTION

Presently, the navigation method of AGV generally sets up a set of position and orientation sequences to be executed based on the movement track to be traveled by AGV, and AGV moves according to the position and orientation sequences and go through the preset movement track.

In the prior art, the navigation devices used in some AGV reckons the position and orientation of the object by running preset functions on the measured data. As the AGV moves constantly, measurement errors continue to accumulate, and AGV strays from the preset movement track. Therefore, those skilled in the art need to devise a method to correct position and orientation of such AGV navigation modes. Positioning errors correction is one of the frequently-used auxiliary correction method in the prior art, and the common of which are ultrasonic location errors correction, laser positioning errors correction and image positioning errors correction. However, it's very demanding on the application apparatus and operational environmental for these positioning errors corrections, not only of poor convenience, but also of high cost, and they are sensitive to disturbance, which leads to low precision and poor stability of the device.

SUMMARY OF THE INVENTION

It is therefore an object of the present invention to overcome the defects of the prior art and provide a navigation errors correction method based on magnetic nail positioning of precisely positioning, strong adaptability to environment and low cost in application devices.

In order to overcome the above-mentioned technical deficiencies, the present invention introduces the following technical solution: A navigation errors correction method based on magnetic nail positioning, comprising the following steps:

(a). magnetic nail is set within the moving area of AGV, and an information-bearing magnetic field mode is established according to the magnetic field formed by said magnetic nail and stored in a navigation device;

(b). Said navigation device in the AGV guides the movement of AGV;

(c). Magnetic sensor on the AGV detects the features of magnetic field established by magnetic nail on the movement track;

(d). Contrast features of magnetic field detected by magnetic sensor with those of magnetic field mode prestored by the navigation device, and reckon the relative position of magnetic nail and the AGV;

(e). Based on the relative position of magnetic nail and the AGV, reckon the current position of the AGV;

(f). Said navigation device adjusts the position and orientation of the AGV and guides the AGV to repair the movement errors based on the reckoning position of the AGV.

Compared the navigation errors correction method disclosed by the present invention with the laser positioning errors correction and ultrasonic location errors correction in the prior art, the present invention has the virtues of no restriction of space layout and the accuracy is not susceptible to the medium; While Compared with the image positioning errors correction in the prior art, the present invention has the virtues of not susceptible to light disturbances or ground contamination. It can thus be seen from above-mentioned comparisons, compared with the prior art, the invention has the advantages of precisely positioning, strong adaptability to environment and low cost in application devices.

Further, more than two magnetic nail are set along the movement track of the AGV. If there are two magnetic nails, navigation device is not merely able to determine its own position based on the relative position of itself with one of magnetic nails, but also to get more precise positional information by using two or more magnetic nail at the same time, thus correcting orientation errors. If the navigation errors accumulate very slowly, the density of magnetic nails arrangement may be decreased, thus the space of magnetic nails arrangement may be increased; If the navigation errors accumulate very fast, the density of magnetic nails arrangement may be increased, thus the space of magnetic nails arrangement may be decrease.

Further, said magnetic nail is laid onto ground surface of the movement track of AGV. If the AGV travels the correct way, it passes through right over the magnetic nail. As the strength of magnetic field is more strong right over the magnetic nail, it is more easily to detect the signal and improve the accuracy of positioning.

Further, said magnetic sensor on the AGV detects the features of magnetic field around periodically so that navigation errors can be promptly found and corrected.

Further, a coordinate system is set within the moving area of AGV. Said magnetic nail is located in the coordinate system, thus position reckoning of the AGV is based on said coordinate system. It is more simple and prompt for reckoning based on coordinate system.

Further, if the magnetic sensor fails to detect magnetic field signals when the AGV passes over the magnetic nail, said AGV stops moving, and/or, report the failure to users. If the AGV travels normally within the area of magnetic nail, corresponding magnetic field signals should be obtained; when magnetic sensor fails to obtain magnetic field signals, it means abnormal operation of AGV, and the AGV will take the above-mentioned emergency measures.

BRIEF DESCRIPTION OF THE DRAWINGS

FIG. 1 is a flow chart of AGV navigation method based on magnetic nail positioning provided by the present invention.

DETAILED DESCRIPTION OF PREFERRED EMBODIMENTS

Referring to FIG. 1, a navigation errors correction method based on magnetic nail positioning disclosed by the present invention, comprising the following steps:

(a). Magnetic nail is set within the moving area of AGV, and an information-bearing magnetic field mode is established according to the magnetic field formed by said magnetic nail and stored in a navigation device;

(b). Said navigation device in the AGV guides the movement of AGV;

(c). Magnetic sensor on the AGV detects the features of magnetic field established by magnetic nail on the movement track;

(d). Contrast features of magnetic field detected by magnetic sensor with those of magnetic field mode prestored by the navigation device, and reckon the relative position of magnetic nail and the AGV;

(e). Based on the relative position of magnetic nail and the AGV, reckon the current position of the AGV;

(f). Said navigation device adjusts the position and orientation of the AGV and guides the AGV to repair the movement errors based on the reckoning position of the AGV.

Compared the navigation errors correction method disclosed by the present invention with the laser positioning errors correction and ultrasonic location errors correction in the prior art, the present invention has the virtues of no restriction of space layout and the accuracy is not susceptible to the medium; While Compared with the image positioning errors correction in the prior art, the present invention has the virtues of not susceptible to light disturbances or ground contamination. It can thus be seen from above-mentioned comparisons, compared with the prior art, the invention has the advantages of precisely positioning, strong adaptability to environment and low cost in application devices As a preferred embodiment: more than two magnetic nail are set along the movement track of the AGV. If there are two magnetic nails, navigation device is not merely able to determine its own position based on the relative position of itself with one of magnetic nails, but also to get more precise orientation information by using two or more magnetic nail at the same time, thus correcting orientation errors. If the navigation errors accumulate very slowly, the density of magnetic nails arrangement may be decreased, thus the space of magnetic nails arrangement may be increased; if the navigation errors accumulate very fast, the density of magnetic nails arrangement may be increased, thus the space of magnetic nails arrangement may be decreased.

Said magnetic nail is laid onto ground surface of the movement track of AGV. If the AGV travels the correct way, it passes through right over the magnetic nail. As the strength of magnetic field is more strong right over the magnetic nail, it is more easily to detect the signal and improve the accuracy of positioning.

Said magnetic sensor on the AGV detects the features of magnetic field around periodically so that it can adjust position and orientation of AGV during AGV moving process, thus making AGV moving in a more accurate manner. A coordinate system is set within the area of AGV travels. Said magnetic nail is located in the coordinate system, thus position reckoning of the AGV is based on said coordinate system. It is more simple and prompt for reckoning based on coordinate system.

As a preferred embodiment: if the magnetic sensor fails to detect magnetic field signals when the AGV passes over the magnetic nail, said AGV stops moving, and/or, report the failure to users; If the AGV travels normally within the area of magnetic nail, corresponding magnetic field signals should be obtained. When magnetic sensor fails to obtain magnetic field signals, it means abnormal operation of AGV, and the AGV will take the above-mentioned emergency measures.

According to the disclosure and teaching of above-mentioned specification, those skilled in the art of the present invention can still make changes and modifications to above-mentioned embodiment, therefore, the scope of the present invention is not limited to the specific embodiments disclosed and described above, and all those modifications and changes to the present invention are within the scope of the present invention as defined in the appended claims. Besides, although some specific terminologies are used in the specification, it is merely as a clarifying example and shall not be constructed as limiting the scope of the present invention in any way.

What is claimed is:

1. A navigation error correction method based on magnetic nail positioning, the method comprising the following steps:
   (a) a single magnetic nail is set within a moving area of an automated guided vehicle (AGV), and an information-bearing magnetic field mode is established according to a magnetic field formed by said single magnetic nail and stored in a navigation device;
   (b) said navigation device guides the movement of AGV;
   (c) a magnetic sensor on the AGV detects features of the magnetic field established by the single magnetic nail on a movement track;
   (d) contrast the features of the magnetic field detected by the magnetic sensor with those of the magnetic field mode prestored in the navigation device, and reckon the relative position of the single magnetic nail and the AGV;
   (e) based on the relative position of the single magnetic nail and the AGV, reckon a current position of the AGV; and
   (f) said navigation device adjusts the position and orientation of the AGV and guides the AGV to repair a movement error based on the reckoned current position of the AGV.

2. The navigation error correction method based on magnetic nail positioning as claimed in claim 1, wherein two or more magnetic nails are set along the movement track of the AGV.

3. The navigation error correction method based on magnetic nail positioning as claimed in claim 2, wherein said two or more magnetic nails are laid on a ground surface of the movement track of the AGV.

4. The navigation error correction method based on magnetic nail positioning as claimed in claim 1, wherein said magnetic sensor on the AGV detects the features of magnetic field around periodically.

5. The navigation error correction method based on magnetic nail positioning as claimed in claim 1, wherein a coordinate system is set within the moving area of the AGV, and said single magnetic nail is located in the coordinate system such that position reckoning of the AGV is based on said coordinate system.

6. The navigation error correction method based on magnetic nail positioning as claimed in claim 1, wherein if the magnetic sensor fails to detect magnetic field signals when the AGV passes over the single magnetic nail, said AGV stops moving, and/or, reports the failure to users.

\* \* \* \* \*